United States Patent [19]

House et al.

[11] Patent Number: 6,119,247
[45] Date of Patent: Sep. 12, 2000

[54] REMOTE DEBUGGING OF INTERNET APPLICATIONS

[75] Inventors: Daniel Edward House; Brian Joseph Owings, both of San Jose, Calif.

[73] Assignee: International Business Machines Corporation, Armonk, N.Y.

[21] Appl. No.: 09/102,323

[22] Filed: Jun. 22, 1998

[51] Int. Cl.[7] ..................................................... G06F 11/00
[52] U.S. Cl. .................................. 714/38; 717/4; 345/336
[58] Field of Search ........................ 714/38–48; 712/227; 713/201; 707/102, 104; 717/4; 700/26; 345/335, 336

[56] References Cited

U.S. PATENT DOCUMENTS

| | | | |
|---|---|---|---|
| 5,561,763 | 10/1996 | Eto et al. | 395/183.11 |
| 5,630,049 | 5/1997 | Cardoza et al. | 395/183.01 |
| 5,815,653 | 9/1998 | You et al. | 395/183.14 |
| 5,819,093 | 10/1998 | Davidson et al. | 395/704 |
| 5,901,315 | 5/1999 | Edwards et al. | 395/704 |

FOREIGN PATENT DOCUMENTS

WO 98/36356  8/1998  WIPO .............................. G06F 11/00

OTHER PUBLICATIONS

Alwang, Preview: NetDynamics 4.0, Internet: www.netdynamics.com, pp. 1–2, Nov. 1997.

Jacqueline Emigh: Progress Intros Apptivity 1.0 For Java Apps., Newsbytes, Oct. 22, 1997.

Antone Gonsalves: Roaster Moves To Windows, Unix., PC Week, n50, v14, Dec. 1, 1997.

Timothy Dyck: NetDynamics 4.0 Sets A Higher Standard, PC Week, n2, v15, Jan. 12, 1998.

*Primary Examiner*—Robert W. Beausoliel, Jr.
*Assistant Examiner*—Scott T. Baderman
*Attorney, Agent, or Firm*—Gates & Cooper

[57] ABSTRACT

A method, apparatus, and article of manufacture for providing a programming development environment that supports the development of internet and intranet applications. The present invention describes a method, apparatus, and article of manufacture for remotely debugging internet applications. A debug control embedded in a debug proxy file is used to establish a debug session with a development client and to transmit the application to the user computer's browser, so as to present data in controls therein.

18 Claims, 5 Drawing Sheets

REMOTE DEBUGGING OF INTERNET APPLICATIONS

CROSS-REFERENCE TO RELATED APPLICATIONS

This application is related to the following co-pending and commonly-assigned patent applications:

application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed on Mar. 31, 1997 by Daniel E. House, Brian J. Owings, and Shiau—Shiau Pei;

application Ser. No. 08/828,476, entitled "SHARED OBJECT MODEL," filed on Mar. 31, 1997, by Brian J. Owings, Shiau—Shiau Pei, and Daniel E. House;

application Ser. No. 08/828,989, entitled "METHOD AND APPARATUS FOR SIMULATING A MULTI-TIERED COMPUTER ENVIRONMENT," filed on Mar. 31, 1997, by Daniel E. House and Constance J. Nelin;

application Ser. No. 08/828,478, entitled "MULTI-TIER VIEW PROJECT WINDOW," filed on Mar. 31, 1997, by Howard J. Glaser, Daniel E. House, and Constance J. Nelin;

application Ser. No. 08/829,104, entitled "EXTENDER USER INTERFACE," filed on Mar. 31, 1997, by Thomas E. Conrad, Howard J. Glaser, Jean C. Ho, James L. Keesey, Constance J. Nelin, and Gerold J. Wilmot;

application Ser. No. 08/828,846, entitled "SHARED MODULES GRAPHICAL USER INTERFACE," filed on Mar. 31, 1997, by Howard J. Glaser, Daniel E. House, and Constance J. Nelin;

application Ser. No. 08/828,479, entitled "QUERY SELECTION FOR A PROGRAM DEVELOPMENT ENVIRONMENT," filed on Mar. 31, 1997, by Howard J. Glaser and Mary C. Lehner;

application Ser. No. 08/828,477, entitled "DOCKING AND FLOATING MENU/TOOL BAR," filed on Mar. 31, 1997, by Howard J. Glaser, Karl D. Johnson, and Stewart E. Nickolas;

application Ser. No. 08/828,840, entitled "HTML INTEGRATION UTILITY FOR A PROGRAM DEVELOPMENT ENVIRONMENT," filed on Mar. 31, 1997, by Howard J. Glaser;

application Ser. No. 08/828,897, entitled "EXTENDER SMART GUIDE," filed on Mar. 31, 1997, by Howard J. Glaser;

application Ser. No. 08/828,481, entitled "MULTI-TIER DEBUGGING," filed on Mar. 31, 1997, by Daniel E. House, Brian J. Owings, and Shiau—Shiau Pei;

application Ser. No. 08/828,990, entitled "DYNAMIC DISCOVERY OF CONTROLS," filed on Mar. 31, 1997, by Daniel E. House and Constance J. Nelin; and application Ser. No. 08/828,480, entitled "REMOTE SCRIPTING OF LOCAL OBJECTS," filed on Mar. 31, 1997, by Daniel E. House, Constance J. Nelin, and Rebecca B. Nin;

application Ser. No. 08/928,621, entitled "DYNAMICALLY DEBUGGING USER-DEFINED FUNCTIONS AND STORED PROCEDURES," filed on Sep. 12, 1997, by Constance J. Nelin, Gerald H. Roth, Frederick T. Sharp, and Shu-Huar J. Yeh;

application Ser. No. 08/928,620, entitled "STORING P-CODE IN A DATABASE," filed on September 12, 1997, by Curt L. Cotner, Wendy L Koontz, Gerald H. Roth, Frederick T. Sharp and Shu-Huar J. Yeh; and application Ser. No. 08/928,358, entitled "COMPONENT-NEUTRAL BUILDER INTERFACE," filed on Sep. 12, 1997, by Daniel E. House and Brian J. Owings;

all of which applications are incorporated by reference herein.

BACKGROUND OF THE INVENTION

1. Field of the Invention

This invention relates in general to programming development environments performed by computers, and in particular, to a method, apparatus, and article of manufacture for remotely debugging internet applications.

2. Description of Related Art

With the fast growing popularity of the Internet and Intranets, especially Web-based networks, there is also a fast growing demand for Internet and Intranet access to databases. Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

The Internet has considerable potential to provide access to powerfull and complex applications implemented at the Web server to a broad scope of remote clients. This implementation has important benefits such as reducing computer memory and processing requirements at the remote client, and increasing the security of the application by retaining selected portions of the application in a secure location in the Web server. However, one disadvantage of implementing the application remotely from the end user is that the end user is unable to debug or troubleshoot the application when errors or other problems are encountered. This problem can be ameliorated by providing the user with access to the application's source or object code, but this solution would compromise application security. Further, this solution would be communication intensive, and communication bandwidth and latency is already a problem, even for simple Internet applications. What is needed is a method of remotely debugging and troubleshooting internet applications without compromising the security of the application and without placing unnecessary demands on the communication link between the end user and the web server. The present invention satisfies that need.

SUMMARY OF THE INVENTION

To overcome the limitations in the prior art described above, and to overcome other limitations that will become apparent upon reading and understanding the present specification, the present invention discloses a method, apparatus, and article of manufacture for remote debugging of internet applications.

The method begins when a user remotely running the application in a first computer requests debug capability from a development client. The development client generates a debug capability from a development client. The development client HTML filename for the debug proxy file to the user. When the user enters the debug proxy file name, the browser downloads the debug proxy file from the web server. A debug control, which is embedded in the debug proxy file, saves the address of the development client, and switches the user's browser to the application's HTML page. Then, the browser transmits the development client's address to the web server. This address is used to establish a connection between the application server and the web server, and loads the logic for the application into the application server in a debug mode. Finally, a debug connection, which permits the development client to control execution of the application, is opened between the development client and the application server. The invention also comprises an article of manufacture tangibly embodying instructions to perform the above method steps.

The invention also comprises an apparatus for remotely debugging internet applications. The apparatus includes a means for generating a debug proxy file for the application to be debugged in a development client hosted on a second computer, a means for providing the debug proxy file to the user, a means for running a debug control within the debug proxy file to download an application HTML file and for providing the address of the development client to the application server, a means to establish a connection between the development client and the application server using the development client address, and a means for opening a debug connection between the development client and the application server to permit the development client to control the application. The present invention also comprises a memory for storing the debug control in accordance with the above.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Figure 1:
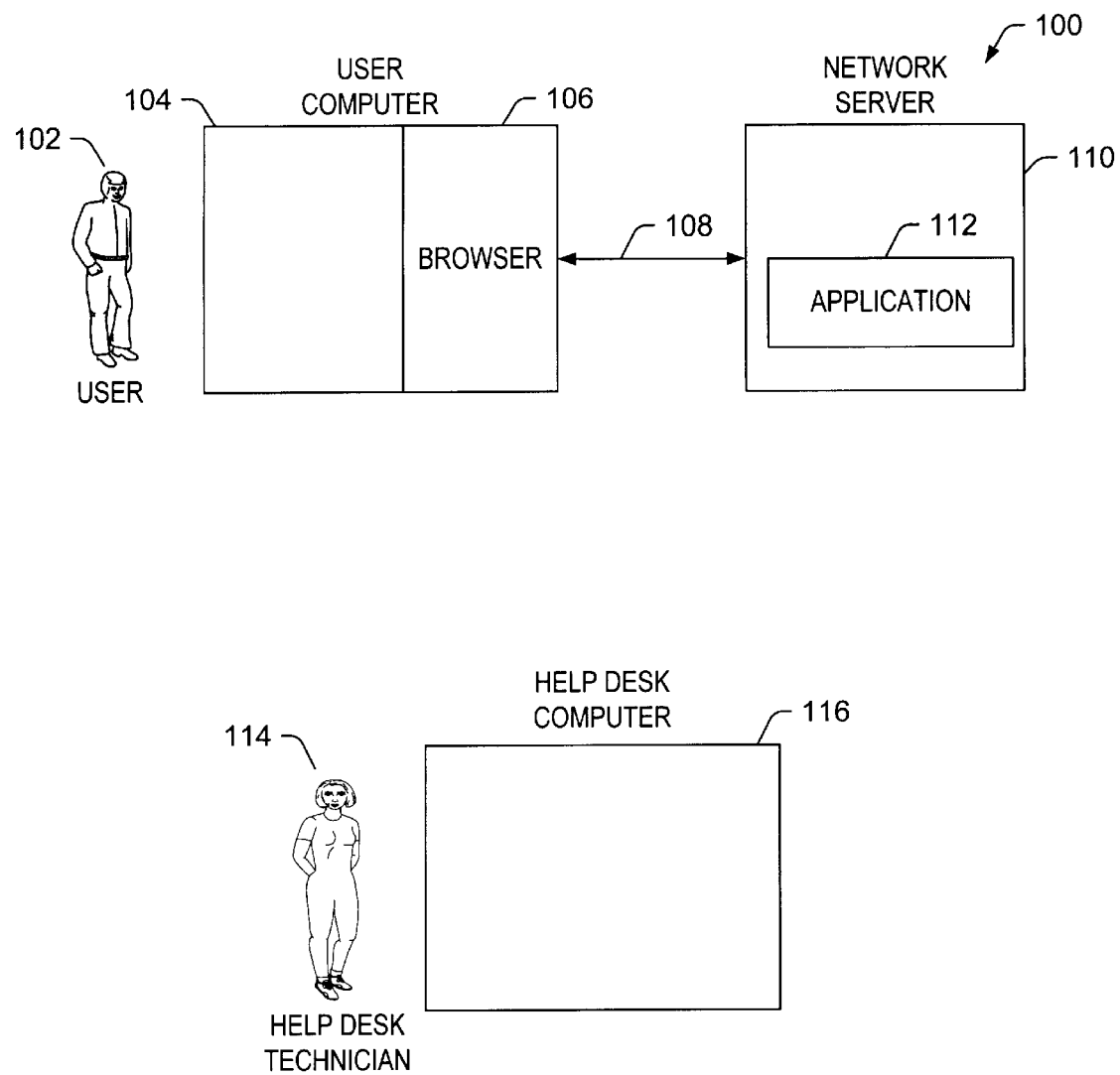
FIG. 1 is a diagram showing a network environment with a remote user.

FIG. 1 is a diagram showing a network environment 100 with one or more remote users 102. In the illustrated network environment, the remote user 102, using a user computer 104 running a browser 106, can access data and execute algorithms hosted by a network server 110 via an interconnecting communication link 108. User computer and help desk computer 116 also comprise a memory and a processing unit for storing and executing instructions to perform the operations described herein. A floppy disk, compact disk (CD), tape, or other means for storing program instructions is insertable into a suitable device in the user computer 104 or the help desk computer 116. The floppy disk tangibly embodies instructions for carrying out operations performed by the user computer 104 or the help desk computer 116. Similar storage devices may be used on other computing entities in the network 100.

As described above, this implementation has several advantages. Application 112 in the network server 110 are accessible by multiple users, yet, the processing and memory requirements at each user computer 104 are substantially less than that which would be required if the application 112 were hosted on each user computer 104. However, when application 112 is placed in this network 100 environment in this way, it can be quite difficult to debug. The problem arises when the user 102 experiences a bug in the application 112 and calls for technical support from the help desk technician 114. Unfortunately, the network server 110 is being accessed by the user 104 at a different location, which is also at a different location than the help desk technician 114. The help desk technician 114 usually does not have access to the logic running on the network server 110 at its location, unless that is also where the help desk technician 114 happens to be. Unfortunately, that is usually not the case.

Figure 2:
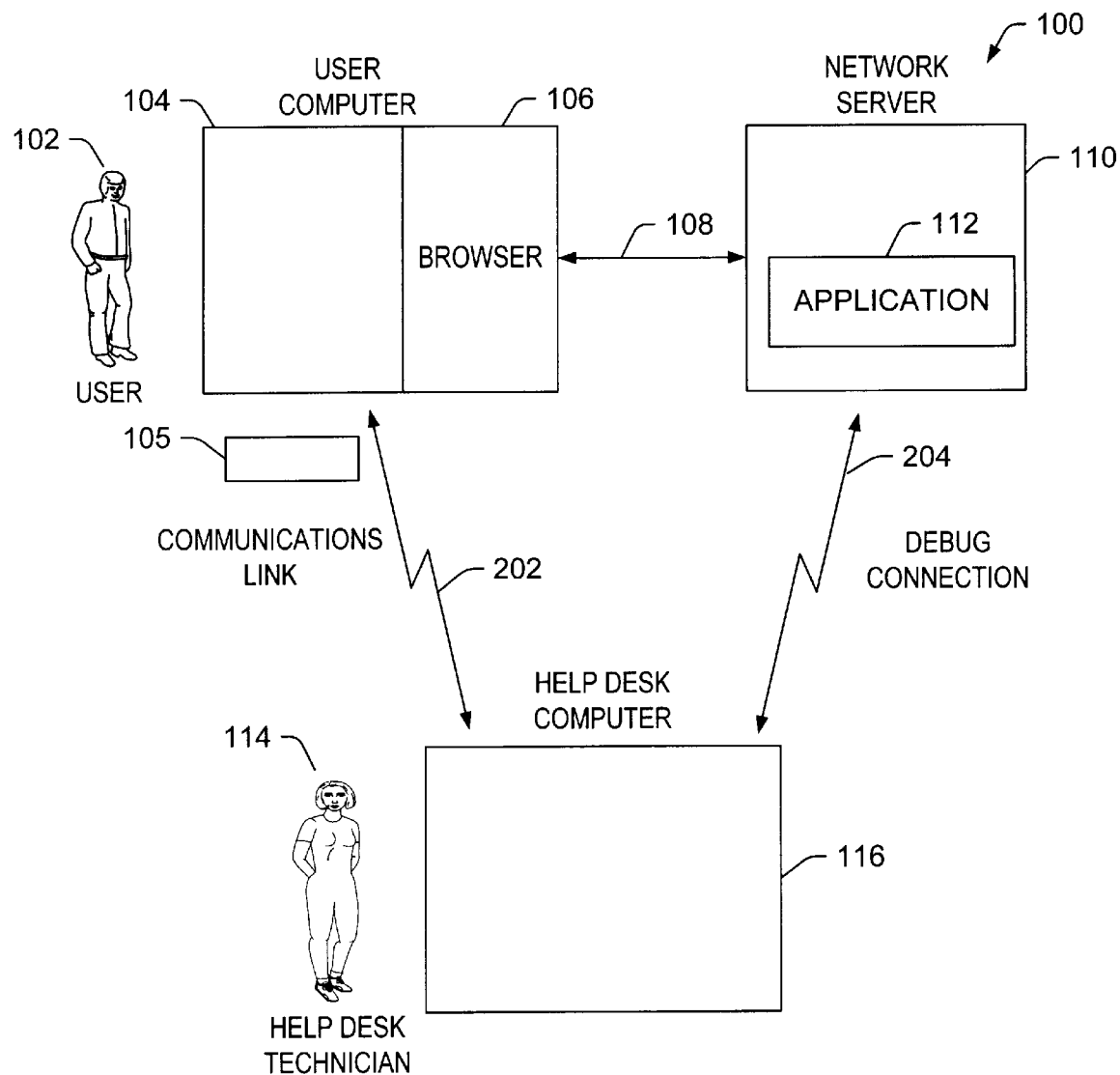
FIG. 2 is a diagram showing a network environment with a remote user obtaining help from a help desk technician.

FIG. 2 is a diagram showing a network environment with a remote user obtaining help from a help desk technician. One way a remote user 102 can obtain help in debugging an application is to contact the help desk technician 114 via communications link 202. Communications link can be manifested by a telephone, internet connection or other similar means. Ordinarily, when the remote user 102 requests help with the application, the help desk technician 114 and the remote user 102 engage in a colloquy discussing the inputs to the application 112, the outputs obtained, and error messages. The help desk technician 114 can also prompt the remote user 102 to enter different values into the computer 104, and take other actions which will assist in debugging the application. A more robust way of accomplishing this task is to establish a debug connection 204 between the help desk computer 116 and the application 112 via debug connection 204.

Figure 3:
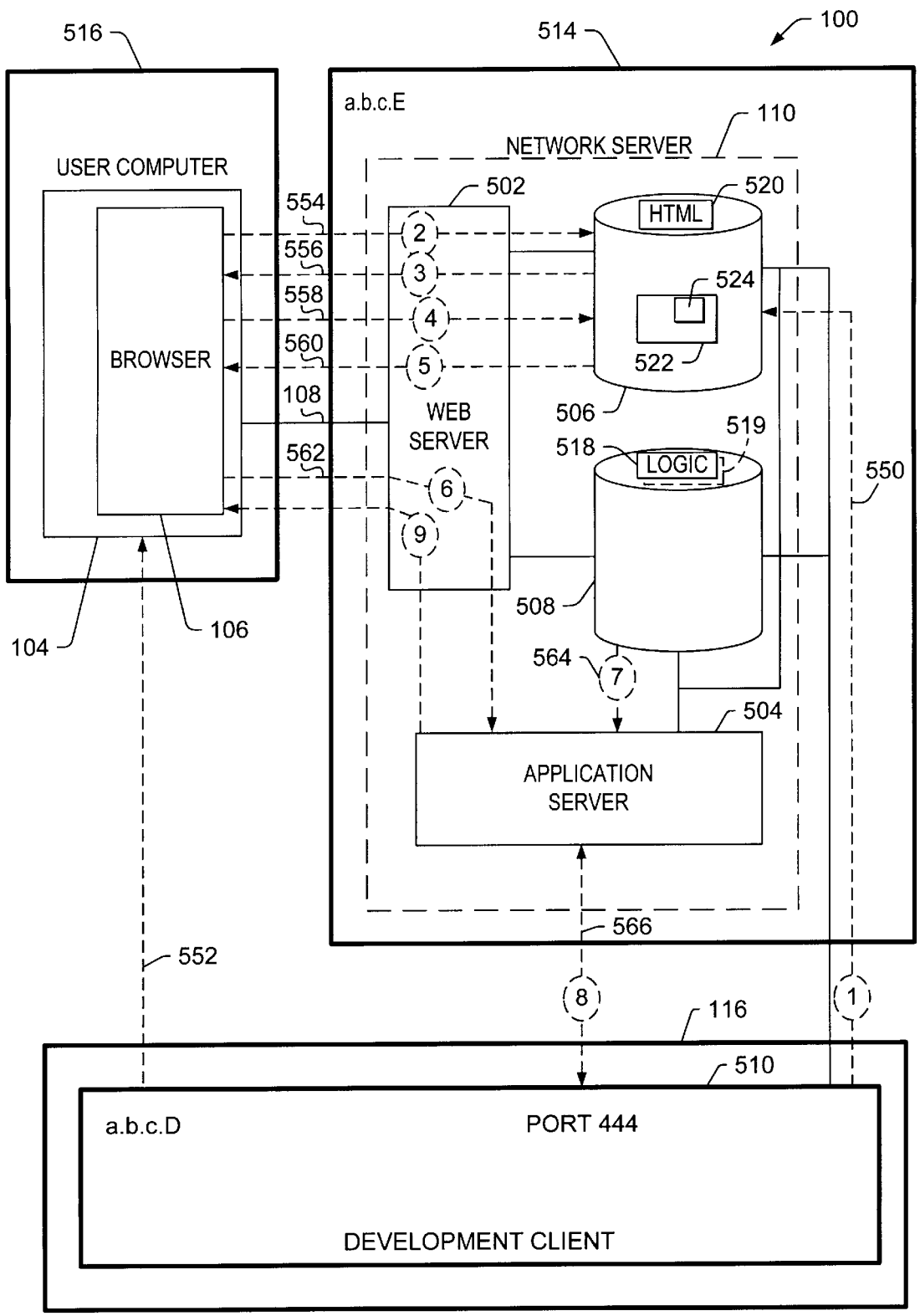
FIG. 3 is a diagram showing an example of remote debugging of an application.

FIG. 3 is a diagram presenting an overview of the network and the process employed to remote debug applications. In this example, network 100 comprises one or more user computers 104, a network server 110, and a development client 510, all generally implemented on separate machines. The network server 110 comprises a web server 502, which, through communications link 108, provides access between the network server 110 and the user computers 104. The network server 110 also comprises an application server 504 for running the applications (shown in FIG. 1 as 112). Applications 112 comprise logical instructions, or program logic 518 stored in first storage device 508 and HTML files 520 with HTML pages, presenting an interface to the application 112 stored in second storage device 506.

When the user 102 somewhere in the network 100 has a problem running a particular application 112 from his browser 106, he calls the help desk technician 114 and describes the problem. Using the present invention, the help desk technician 114 can debug the application while talking to the user 102 on the telephone, even though the network server 110, the user computer 104, and the help desk computer 116 are different physical machines, arbitrarily separated somewhere on the internet.

Referring back to FIG. 3, the process begins when the user encounters a bug or other problem running application 112. For purpose of this discussion, it is assumed that the user 102, running browser 106 on the user computer 104 typed in the following URL to access the application 112 on the network server 110: http://a.b.c.E/application1.html. Further assume that the application 112 is an application which allows the user 102 to order some merchandise or services. After the URL is typed into the user computer 104, the browser 106 contacts the network server 110 via the web server 502, and an HTML page (stored in second storage device 506), is transmitted via the web server 102 to the browser 106 via communication link 108, thereby presenting that HTML page to the user. Ordinarily, the HTML page appears on the user computer 104 with controls (such as buttons, edit input areas, field entry points, etc.) on it. The user interacts with these controls to enter an order, however, when the order is transmitted, the user receives an error message originating from the application server 504, indicating that the application has failed. The user 102 then calls the help desk technician 114 over communications link 202.

The help desk technician 114 answers the call, and asks the user 102 for the URL that the user used to start the application (in this case, http://a.b.c.E/application1.html). Using this information, the help desk technician 114 starts a development client 510 on her help desk machine 116. A development client 116 suitable for this purpose is available via the Visual Age Basic II development client described in co-pending and commonly assigned application Ser. No. 08/828,989, filed Mar. 31, 1997 and entitled "METHOD AND APPARATUS FOR SIMULATING A MULTI-TIERED COMPUTER ENVIRONMENT," which is hereby incorporated by reference herein. Using an "extract project" command (which may be shown as a menu item on the help desk machine 116 display), the help desk technician 114 uses the application1.html file to find the application logic 518 and other associated project files for application 112. Using the project files, the help desk technician 114 "opens" the project by selecting a menu item that allows selection of the project by opening a distinguished file known as an ".app" file. The nature of the ".app" file is described in co-pending and commonly assigned application Ser. No. 08/828,854, filed Mar. 31, 1997, and entitled "PROGRAMMING DEVELOPMENT ENVIRONMENT FOR INTRANET AND INTERNET APPLICATIONS EMPLOYING UNIQUE PROJECT DATA STRUCTURE," which is hereby incorporated by reference herein. After performing these operations, the help desk technician 114 has the project associated with the application 112 open.

Next, the help desk technician 114 selects a menu item called "Generate Debug Proxy." This causes a new HTML file to be generated and placed on the network server 110 with the other HTML files for the application 112 (in storage device 506). This debug proxy HTML file 522 contains a Java Applet control hereinafter referred to as a debug control 524. As with other such controls, the debug control 524 comprises associated <PARAM> (parameter) tags. The parameter tags include (1) the URL the user 102 would enter into his browser 106 (http://a.b.c.E/application1.html) and (2) an internet protocol (IP) address and port number (illustrated in FIG. 3 as a.b.c.D:444) for the development client 510. An example of the Java Applet HTML tags for the debug control 524 the following:
<APPLET CODE=VABII_DEBUG.CLASS>
<PARAM NAME=URL VALUE="http:/a.b.c.d.E/application1.html">
<PARAM NAME=DEBUGDATA VALUE="a.b.c.D:444">
</APPLET>

Upon selecting the "Generate Debug Proxy" command, the development client 510 published the debug proxy HTML file 522 and notified the help desk technician 114 of the name of the file. For illustrative purposes, it is assumed here that the name of the file 522 is "debug123.html." The development client 510 then places this file 522 in the same directory in storage device 520 where all of the other HTML files for the application 112 are located. The foregoing steps are represented by the dashed line 550 and circled number "one" shown in FIG. 3.

Next, using communications link 202, the help desk technician 114 instructs the user 102 to enter the debug proxy file 522 HTML (http://a.b.c.E/debug123.html) into his browser 106. This is indicated by dashed line 552. When the user types this HTML into his browser 106, a message having the debug proxy filename is sent to the web server. This is indicated by dashed line 554. The web server 502 retrieves the debug proxy file 522, downloads it in the user computer 104 via the web server 502 and communication link 108. This is indicated by dashed line 556. The debug control 524 is also downloaded from the web server 502, because the HTML for debug123.html has the <APPLET> tag that specifies it. The debug control 524 begins running and senses both the URL and DEBUDATA parameter tags discussed above.

Using the URL parameter tag, the debug control 524 switches the browser 106 to that URL (http://a.b.c.E/Application1.html). And saves the data indicated by the DEBUDATA parameter tag (which specifies the development client 510 address). This is indicated by dashed lines 558 and 560.

Then, the browser 106 downloads the application 112 HTML file 520 "application1.html." The debug controls are downloaded with the application 112 HTML file 520. When the HTML file 520 is received by the user computer 104, it is interpreted by the browser 106, as would be the case with any HTML file. The debug control 524 then finds the saved debugging data (in this case, DEBUG_DATA= "a.b.c.D:444). This is indicated by dashed line 560. Of course, the address and other location information can be specified using internet protocol (IP) address numbers such as x.y.z.q., where x, y, z, and q are numbers between 0 and 255, or by using shorthand names, such as sample.com, because, using a standard protocol such as Domain Name Services (DNS), shorthand names are transparently converted into IP addresses.

When the Java Applets begin to run inside the browser, they contact the web server 502 which causes the web server 502 to contact the application server 504. This is accomplished with an http cgi syntax further described in co-pending and commonly assigned application Ser. No. 08/828,480, entitled "REMOTE SCRIPTING OF LOCAL OBJECTS," which is hereby incorporated by reference herein. Debug data (here a.b.c.D:444) is also passed to the application server 504. This is indicated by dashed line 562.

Next, the application server 504 loads the application logic 518 into the application server 504. This is indicated by dashed line 564.

Since the application server 504 was supplied with debug data (the address of the development client 510 "a.b.c.D:444"), the application server 504 opens a debugging connection between the application server 504 and the development client 510 located at Internet Protocol address and port a.b.c.D:444, using standard TCP/IP socket protocols. The help desk computer 116 is now debugging the application while the user 102 interacts with application 112. Logic running in the application server 504 returns information to applets running in the browser 106. This information could include updated control properties which could cause the applets to display new information in the browser 106. For example, text can be displayed to prompt the user to enter data, a software trace can be displayed, or a button label or color can be changed.

The help desk technician 114 now watches as the user 102 interacts with the application 112. Application server 504 is instructed to stop executing the application 112 when an error occurs, and notifies the debug connection 566. Hence, the help desk technician 114 will see the application 112 stop in the case of an application 112 failure. Even if the application 112 does not fail, the help desk technician 114 can set breakpoints in the source code and watch variables, or could use many other techniques to assist the user 102 in debugging the application 112.

Using the aforementioned technique, other unique features can be implemented. For example, the development client 510 can be restricted to allow debugging of preexisting applications only, without permitting new applications to be published (and hence, available to others). This allows for remote debugging, but also for corporate control over Internet application publishing. This feature is made possible by the use of the debug proxy file 524 (debug123.html) instead of allowing application1.html to be modified.

Also, since there may be many simultaneous users 102 of the application 112, but only one user 102 with a problem, the debug proxy file 524 allows that one user 102 to be involved in debugging while other users are unaffected, since other users can still access the application via the http://a.b.c.E.application1.html, and these users 102 do not cause debugging sessions to be established back to the help desk technician 114. This is because a debug data was never presented to the application server 504.

Figure 4:
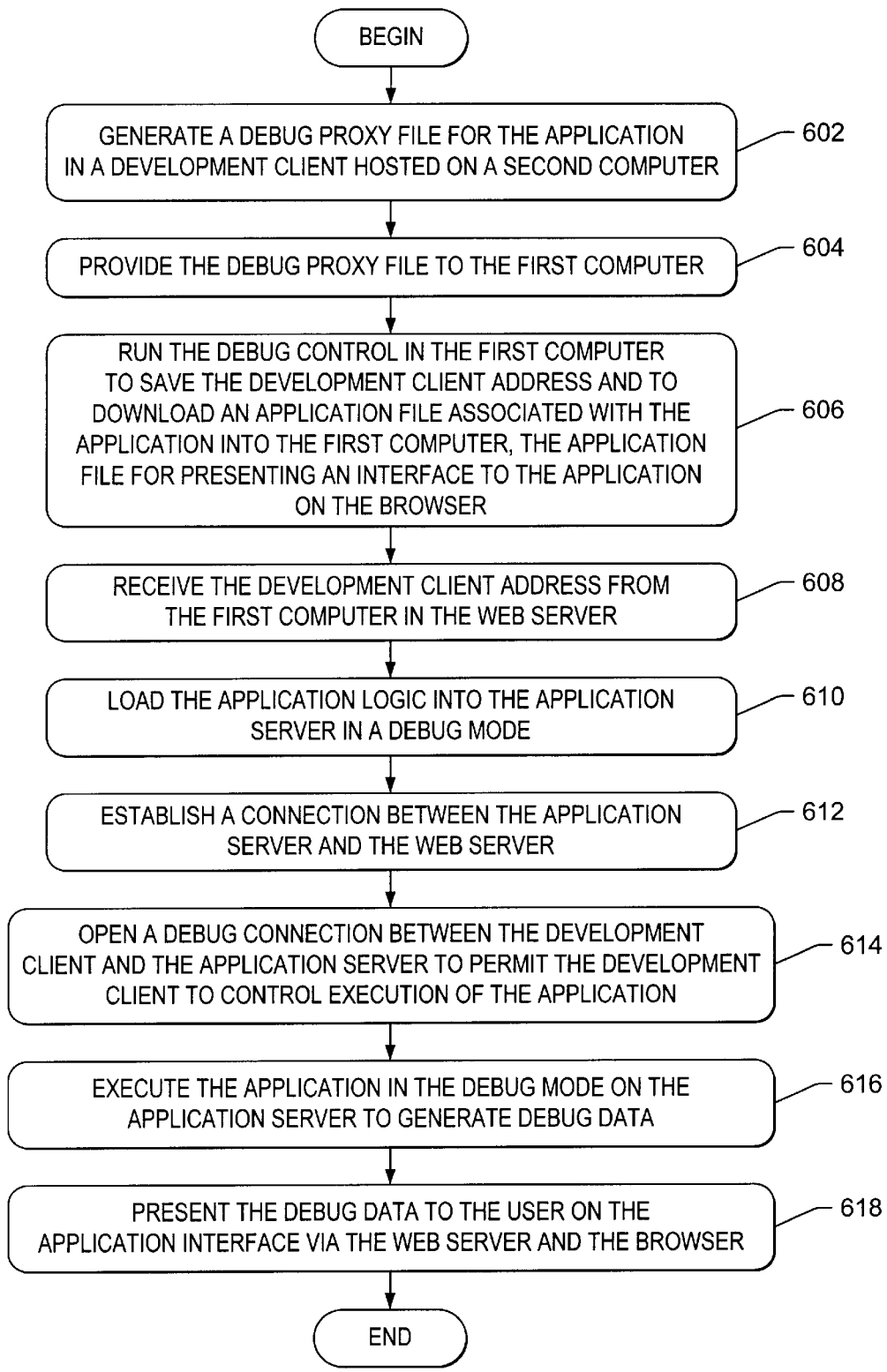
FIG. 4 is a flow chart showing operations performed in practicing the present invention.

FIG. 4 is a flow chart showing the operations used to practice one embodiment of the present invention. In response to a user 102 request for assistance, the development client 510 generates a debug proxy file 522 is generated by the development client 510. This is indicated by block 602. Then, the debug proxy file 522 is provided 604 to the user computer 104. Next, the debug control 524 embedded in the debug proxy 522 is executed 606 to save the development client 510 address and to download an application HTML file 520 associated with application 112 into the user computer 104. The application HTML file 520, when interpreted by the browser 106, presents an interface between the user 102 and the application 112.

Next, the development client 510 address is received from the user computer 104 in the application server 504 via the web server 502. This is indicated in block 608. Then, the application logic 518 associated with the application 112 is downloaded 610 into the application server 504 in a debug mode. A connection is established 612 with between the application server and the web server 612, and a debug connection is opened 614 between the development client 510 and the application server 504. This debug connection allows the development client to control execution of the application 112. This can be accomplished by inserting test code, setting flags, examining variables, or by other methods known in the art. Next, the application 112 is executed 616 on the application server 504 in the debug mode to generate debug data. Finally, the debug data is presented 618 to the user on the application interface via the web server 502 and the browser 106.

Figure 5:
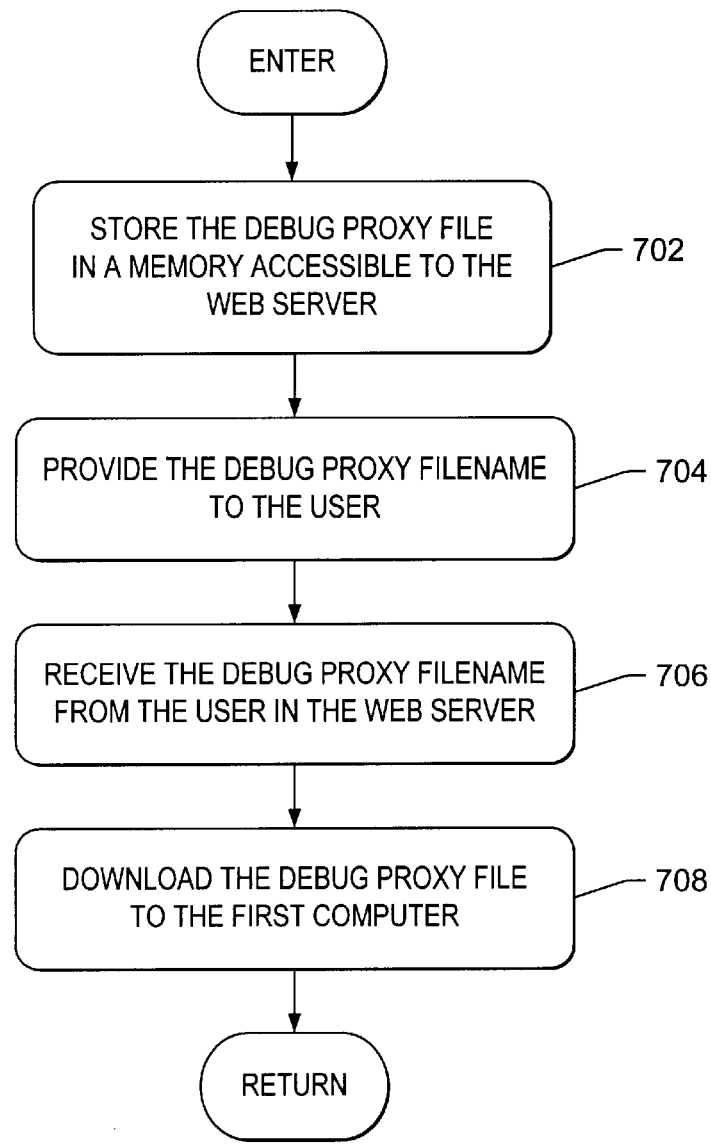
FIG. 5 is a flow chart showing the operations performed in providing a debug proxy file to a remote user.

FIG. 5 is a flow chart illustrating the process steps performed to provide the debug proxy file 524 to the user computer 104 in one embodiment of the invention. First, the debug proxy file 524 is stored 702 in a memory such as storage device 520 accessible to the web server 502. Next, a filename for the debug proxy file 524 is provided 704 to the user 102. Then, the user transmits the debug proxy filename to the web server 502. The web server 502 receives 706 the filename, and downloads the debug proxy file 524 to the user computer 104.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for remotely debugging internet applications. The method begins when a user remotely running the application in a first computer requests debug capability from a development client. The development client generates a debug proxy file with a debug control for the application, and transmits an HTML filename for the debug proxy file to the user. When the user enters the debug proxy file name, the browser downloads the debug proxy file from the web server. A debug control, which is embedded in the debug proxy file, saves the address of the development client, and switches the user's browser to the application's HTML page. Then, the browser transmits the development client's address to the web server. This address is used to establish a connection between the application server and the web server, and loads the logic for the application into the application server in a debug mode. Finally, a debug connection, which permits the development client to control execution of the application, is opened between the development client and the application server.

The invention also comprises an apparatus for remotely debugging internet applications. The apparatus includes a means for generating a debug proxy file for the application to be debugged in a development client hosted on a second computer, a means for providing the debug proxy file to the user, a means for running a debug control within the debug proxy file to download an application HTML file and for providing the address of the development client to the application server, a means to establish a connection between the development client and the application server using the development client address, and a means for opening a debug connection between the development client and the application server to permit the development client to control the application. The present invention also comprises a memory for storing the debug control in accordance with the above.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of remotely debugging an application executable on an application server, the application implemented by application logic and executable by a remote user via a browser hosted on a first computer communicatively coupled to a web server, the method comprising:

generating a debug proxy file for the application in a development client hosted on a second computer, the debug proxy file identified by a debug proxy filename and having a debug control including a locator for the application and an address for the development client;

providing the debug proxy file to the first computer;

running the debug control in the first computer to save the development client address and to download an application file associated with the application into the first computer, the application file for presenting an interface to the application on the browser;

establishing a connection between the application server and the web server and loading the application logic into the application server in a debug mode when the development client address is received from the first computer in the web server; and opening a debug connection between the development client and the application server, the debug connection permitting the development client to control the execution of the application.

2. The method of claim 1, further comprising:

executing the application in the debug mode on the application server to generate debug data; and presenting the debug data to the user on the application interface via the web server and the browser.

3. The method of claim 1, wherein the debug proxy file is generated in response to a request from a user.

4. The method of claim 1, wherein the step of providing the debug proxy file to the first computer comprises the steps of:

storing the debug proxy file in a memory accessible to the web server;

providing the debug proxy filename to the user;

receiving the debug proxy filename from the user in the web server; and downloading the debug proxy file to the first computer.

5. The method of claim 1, wherein the application file and the debug proxy file are stored in the same directory.

6. The method of claim 1, wherein the application locator is a universal resource locator, the development client address comprises a port and internet protocol address number for the development client, and the debug proxy file and the application files are hypertext markup language files.

7. The method of claim 1, wherein the development client is restricted to allow debugging of pre-existing applications, and does not allow modification of an old application.

8. A program storage device, readable by computer having a processor and a memory, tangibly embodying one or more programs of instructions executable by the computer to perform the method steps of remotely debugging an application executable on an application server, the application implemented by application logic and executable by a remote user via a browser hosted on a first computer communicatively coupled to a web server, the method steps comprising:

generating a debug proxy file for the application in a development client hosted on a second computer, the debug proxy file identified by a debug proxy filename and having a debug control including a locator for the application and an address for the development client;

providing the debug proxy file to the first computer;

running the debug control in the first computer to save the development client address and to download an application file associated with the application into the first computer, the application file for presenting an interface to the application on the browser;

establishing a connection between the application server and the web server and loading the application logic into the application server in a debug mode when the development client address is received from the first computer in the web server; and opening a debug connection between the development client and the application server, the debug connection permitting the development client to control the execution of the application.

9. The program storage device of claim 8, wherein the method steps further comprise the steps of:

executing the application in the debug mode on the application server to generate debug data; and presenting the debug data to the user on the application interface via the web server and the browser.

10. The program storage device of claim 8, wherein the method step of providing the debug proxy file to the first computer comprises the method steps of:

storing the debug proxy file in a memory accessible to the web server;

providing the debug proxy filename to the user;

receiving the debug proxy filename from the user in the web server; and downloading the debug proxy file to the first computer.

11. An apparatus for remotely debugging an application executable on an application server, the application implemented by application logic and executable by a remote user via a browser hosted on a first computer communicatively coupled to a web server, comprising:

means for generating a debug proxy file for the application in a development client hosted on a second computer, the debug proxy file identified by a debug proxy filename and having a debug control including a locator for the application and an address for the development client;

means for providing the debug proxy file to the first computer;

means for running the debug control in the first computer to save the development client address and to download an application file associated with the application into the first computer, the application file for presenting an interface to the application on the browser;

means for establishing a connection between the application server and the web server and loading the application logic into the application server in a debug mode when the development client address is received from the first computer in the web server; and means for opening a debug connection between the development client and the application server, the debug connection permitting the development client to control the execution of the application.

12. The apparatus of claim 11, further comprising:

means for executing the application in the debug mode on the application server to generate debug data; and means for presenting the debug data to the user on the application interface via the web server and the browser.

13. The apparatus of claim 11, wherein the debug proxy file is generated in response to a request from a user.

14. The apparatus of claim 11, wherein the means for providing the debug proxy file to the first computer comprises:

means for storing the debug proxy file in a memory accessible to the web server;

means for providing the debug proxy filename to the user;

means for receiving the debug proxy filename from the user in the web server; and means for downloading the debug proxy file to the first computer.

15. The apparatus of claim 11, wherein the application file and the debug proxy file are stored in the same directory.

16. The apparatus of claim 11, wherein the application locator is a universal resource locator, the development client address comprises a port and internet protocol address number for the development client, and the debug proxy file and the application files are hypertext markup language files.

17. The apparatus of claim 11, wherein the development client is restricted to allow debugging of pre-existing applications, and does not allow modification of an old application.

18. A memory for storing data accessible and processible by a computer, comprising:

a data structure including a debug control enabling debugging of an application hosted on a second computer, the debug control having instructions for storing information regarding a development client and an application file associated with the application; and wherein the debug control includes a locator for the application and an address for the development client.

* * * * *